(No Model.)
G. A. KROHN.
VEHICLE WHEEL HUB.
No. 601,853. Patented Apr. 5, 1898.
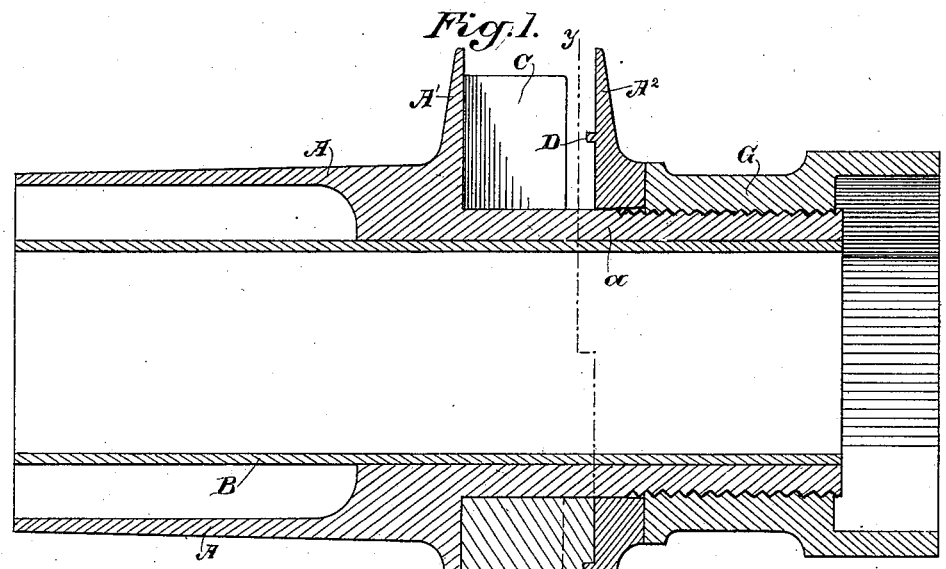
Fig. 1.
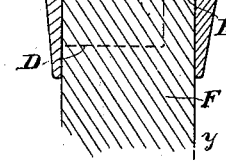
Fig. 2.
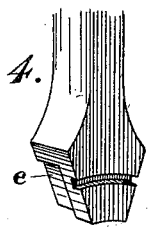
Fig. 4.
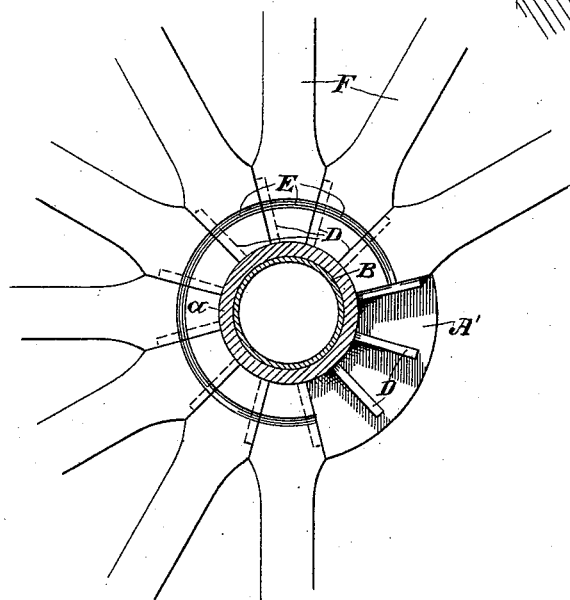
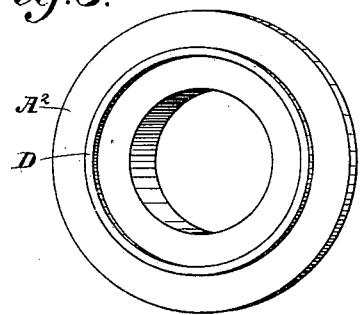
Fig. 3.
Fig. 5.
Fig. 6.
Witnesses,
Inventor,
Gustave A. Krohn
By Dewey & Co.
Attys.

UNITED STATES PATENT OFFICE.

GUSTAVE A. KROHN, OF GOLDGULCH, CALIFORNIA.

VEHICLE-WHEEL HUB.

SPECIFICATION forming part of Letters Patent No. 601,853, dated April 5, 1898.

Application filed June 28, 1897. Serial No. 642,589. (No model.)

*To all whom it may concern:*

Be it known that I, GUSTAVE A. KROHN, a citizen of the United States, residing at Goldgulch, county of Madera, State of California, have invented an Improvement in Vehicle-Wheel Hubs; and I hereby declare the following to be a full, clear, and exact description of the same.

My invention relates to improvements in hubs for vehicles; and it consists in details of construction which will be more fully explained by reference to the accompanying drawings, in which—

Figure 1 is a sectional view of my hub, showing its construction. Fig. 2 is a transverse section of the same on line $y\ y$ of Fig. 1. Fig. 3 is a view of the slidable flange. Fig. 4 is a view of a spoke. Fig. 5 is an end view of the hub. Fig. 6 is a modification of the same.

The object of my invention is to provide such a construction of wheel-hubs as will enable the maker to put the wheel together and lock the spokes firmly in place without the use of separate screws or bolts to secure the parts of the hub together.

The hub consists of the part A, which has a cylindrical interior and is made of the proper length to contain the inner box B, this box either being tapered or otherwise shaped and adapted to run upon an ordinary spindle, or it may contain ball, roller, or other improved bearings, but is no part of my present invention.

The sleeve A has upon it a radial flange A', against which the sides of the spokes will abut when they are in position.

$A^2$ is a second flange of similar shape and depth to A', and this flange is movable upon the part $a$ of the sleeve, so that when this flange $A^2$ is moved toward the fixed flange A', the spokes being in position, the latter will be clamped between the two flanges.

The flange A' has cast or formed with it at intervals the radially-projecting plates or diaphragms C. These are preferably placed at intervals of every other spoke, so that when the spokes are introduced they will abut against one of these flanges on one side and against each other upon the opposite sides. These radial webs or flanges thus serve to support the spokes at suitable intervals and retain them in position.

Upon the flange $A^2$ is formed an annular projecting rib D at a sufficient distance between the outer and inner periphery of the flange. This rib is adapted to enter slots E, which are made in the spokes F. The portions of the meeting faces of the spokes which enter between the flanges A' and $A^2$ are beveled, as shown, so that their meeting faces are essentially radial to the center of the hub. The faces of the spokes which abut against the radial plates C' are cut away, as shown at $e$, so as to form a chamber for the plate. In the present case I have shown this cut-away portion as being entirely formed in the inner end of one of the spokes, while the adjacent one will simply abut against the side of the plate having nothing cut out of it. The meeting faces of this spoke and the next one will abut without an intervening plate, and the next spoke will again be cut away to fit the next plate, and so on around the wheel until the number of spokes necessary or desired have been put in and the wheel completed.

G is a nut which fits upon the threaded outer end $a$ of the sleeve A, and it is formed with a polygonal exterior or interior, so that a suitable wrench can be applied to turn it upon the screw-threads of the part $a$. This nut being screwed up forces the plate $A^2$ against the spokes, which are locked in position against the disk A', and when screwed up the annular rib D enters the corresponding grooves E of the spokes, thus locking them firmly in place, the inner ends of the spokes abutting against the periphery of the sleeve $a$, where it is exposed between the disks A' and $A^2$. Between the sleeve and the inner ends of the spokes may be inserted a piece of leather or other suitable substance, and strips of fiber may also be inserted between the sides of the spokes and the clamping-disks. In this manner the spokes are firmly secured within the hub without the employment of any transverse bolts or pins, such as are customarily used in this class of wheels.

In order to lighten the sleeve A, I have shown it cast hollow with radial ribs $a'$, as shown in Fig. 5, while the outer shell is of sufficient thickness to prevent bruising or indentation. The hub is thus made lighter, the radial ribs serving to properly support the shell, and the box B extends interior to these ribs, as shown.

In some cases it may be found desirable to fill this cut-away space with wood, so as to make it solid, and in this case I form annular ribs H around the interior of this portion, these ribs projecting slightly into the interior channel. When the wooden parts are driven in, they slip readily over the ribs H by reason of the bevel of the exterior portion; but when it is attempted to remove them the ribs will, by reason of their angle, resist any such attempt.

The whole device forms a simple complete hub, easily taken apart, if desired, and easily set up, the felly and tire being placed upon the ends of the spokes in any usual or desired manner.

Having thus described my invention, what I claim as new, and desire to secure by Letters Patent, is—

1. In a vehicle-wheel hub, an exterior hub or sleeve, an interior box or journal to receive the spindle upon which the wheel turns, a fixed circular flange projecting outwardly from the hub having the inner face in a plane transverse to the axis, and the opposite end of the hub or sleeve being made cylindrical and partially screw-threaded, radial plates fixed or formed with the fixed flange, a disk movable upon the cylindrical portion of the hub having an annular flange projecting from its inner plane face, spokes having corresponding grooves formed to receive the annular flange, said spokes being tapered to enter the space between the disks and between the radial plates and each having a recess in one of its pieces and extending only part way across the same, and adapted to entirely receive one of said plates and to leave a face to abut against the face of an adjacent spoke, and a nut adapted to screw upon the outer end of the sleeve or hub whereby the movable disk is compressed firmly upon the spokes after they are in position and the whole locked together.

2. In a vehicle-wheel hub, an exterior sleeve adapted to contain an interior box or axle-journal and having fixed and movable disks, the inner faces of which are in planes transverse to the axis, one of said disks having projecting radial planes and the other an annular rib and spokes correspondingly cut out and grooved to fit said plates and rib, a screw-threaded nut turnable upon the end of the hub whereby the disks are clamped together upon the spokes, and an open channel formed in the end of the hub with radial ribs substantially as described.

3. In a vehicle-hub, a sleeve having an inner box to form an axle bearing or journal, circular fixed and movable flanges between which the spokes are to be clamped, with suitable means for locking said spokes in place, and a screw turnable upon the sleeve to force the movable flange against the spokes, an open annular channel formed within the disk exterior to the axle-box, said channel having annular inwardly-projecting ribs H and a wood filling driven into said channel and locked in place by said ribs.

In witness whereof I have hereunto set my hand.

GUSTAVE A. KROHN.

Witnesses:
S. H. NOURSE,
JESSIE C. BRODIE.